2,422,681

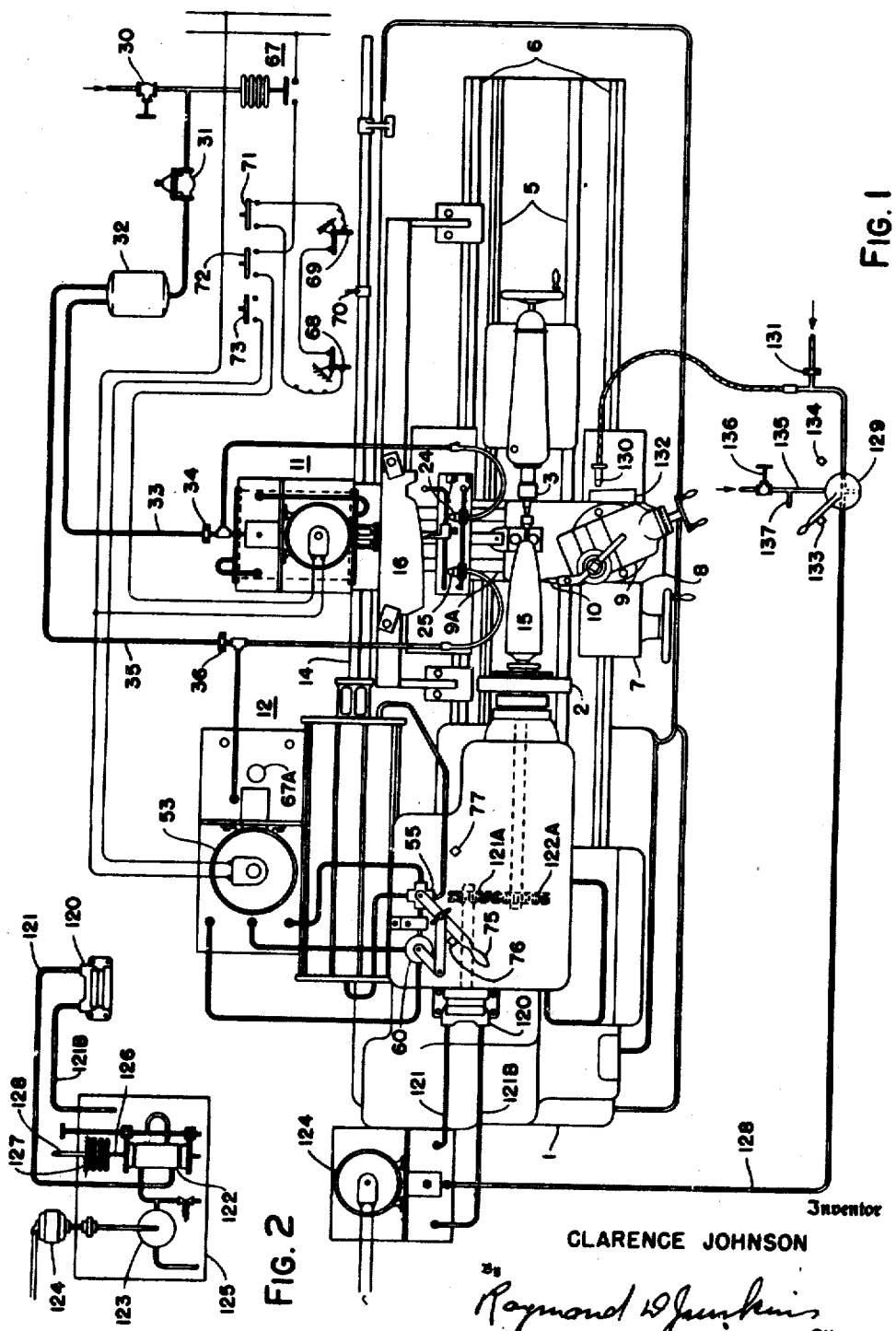

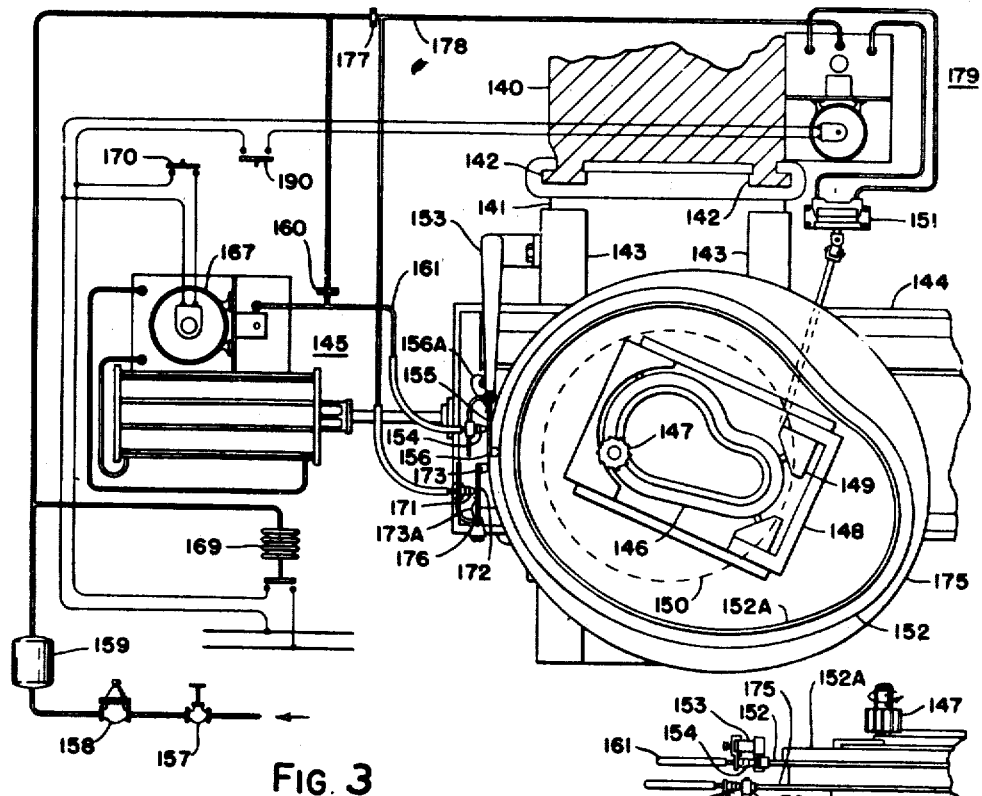
FIG. 3
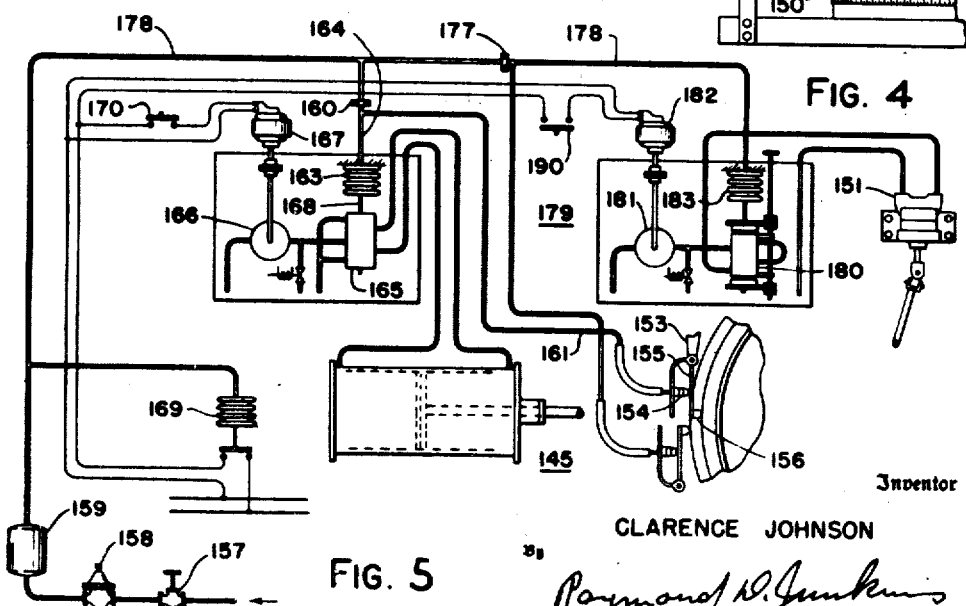
FIG. 4
FIG. 5
Inventor
CLARENCE JOHNSON
By Raymond D. Jenkins
Attorney Patented June 24, 1947

UNITED STATES PATENT OFFICE 2,422,681

MACHINE TOOL CONTROL

Clarence Johnson, South Euclid, Ohio, assignor to Bailey Meter Company, a corporation of Delaware Original application September 23, 1941, Serial No. 412,017, now Patent No. 2,372,427, dated March 27, 1945. Divided and this application February 1, 1943, Serial No. 474,273

5 Claims. (Cl. 82—21)

1

This invention relates to duplicators or profilers as they are sometimes called, for machine tools, such as lathes, slotters, planers, milling machines, die sinking machines, and the like.

One object of my invention is to provide an improved duplicator in which a work piece and a tool are moved relative to each other to cut the work piece to a desired shape.

Another object is to provide a duplicator having means for effecting relative bodily movement between a cutting tool and a work piece, and also having means for rotating the work piece at variable speeds so as to maintain a substantially constant cutting speed.

Still another object is to provide a duplicator having means for moving a cutting tool and a work piece relative to each other in such a way that the latter is cut to a desired shape while the cutting speed is maintained substantially constant.

One object of my invention is to provide a duplicator wherein the linear cutting speed of the tool relative to the work is maintained constant or varied in predetermined manner.

Further objects will be apparent from the description and drawings in which:

Fig. 1 is a plan view of an engine lathe having my invention incorporated therein.

Fig. 2 illustrates diagrammatically a part of the control circuit employed in the embodiment of my invention shown in Fig. 1.

Fig. 3 is a plan view of a milling machine illustrating the application of my invention thereto.

Fig. 4 is a fragmentary view to larger size of a part of Fig. 3.

Fig. 5 is a diagrammatic illustration of the control circuits employed in the embodiment of my invention shown in Fig. 3.

As is well understood by those familiar with the art, in some machine tools, such as lathes, the tool is moved longitudinally and transversely of the work piece, which except for rotation about its center remains stationary. In other machine tools, such as some types of milling machines, the work piece may be moved in two directions, while the tool except for rotation about its axis, remains stationary. In some other types of milling machines, and usually in die sinking machines, the tool may be moved in one or more directions and the work piece also moved in one or more directions. In all instances it will be observed, however, that it is the relative movement between the tool and work piece that causes the work piece to be formed to a desired shape. As one specific embodiment I have chosen to illustrate and describe my invention incorporated in a lathe, wherein the work piece except for rotation about its center remains stationary and the tool is moved transversely and longitudinally thereof. As another specific embodiment of my invention I have illustrated my invention applied to a milling machine wherein the tool, except for rotation about its center remains stationary and the work piece is moved in two directions in order that the tool may cut the work piece to a desired shape. It will thus be evident that my invention is applicable to a wide variety of machine tools, and that when I speak of relative movement between the tool and work piece I include either an arrangement where the tool is stationary and the work piece moves, or the work piece is stationary and the tool is moved, or the combination of the two.

This application is a division of my Patent No. 2,372,427, granted March 27, 1945.

In Fig. 1 I show a preferred embodiment of my invention. It is well appreciated that for optimum results the linear speed of a tool relative to a work piece should remain substantially constant or varied in a predetermined manner. That is to say, there is an optimum speed at which the work should be moved past the tool, or vice versa. In cutting operations, particularly turning operations, the linear speed of the work piece past the tool decreases as the tool approaches the center of rotation of the work piece, if the headstock is rotated at constant speed. Thus, unless the turning operation is interrupted and the rotary speed of the headstock varied as the diameter of the work piece varies, the turning operation will not be performed at maximum efficiency. It is particularly desirable that the speed of the headstock be automatically varied in accordance with changes in diameter of the work piece when the tool is automatically positioned relative to the work by a master, as such automatic operation dispenses entirely with the necessity of an operator devoting his attention to the operation of the lathe. Not only in so-called turning operations is it desirable that the linear speed of the work piece past the tool be varied, but also in other machining operations, and I illustrate my invention applied both to a lathe and to a milling machine, wherein for reasons that will be pointed out more in detail hereinafter the speed of the work piece past the tool is preferably varied in predetermined fashion.

Referring to Fig. 1, I therein show the lathe 1 wherein the tool 10 is automatically positioned transversely of the work piece 15, as well as longitudinally thereof, in accordance with changes in the shape of the master 16. Additionally thereto I further show in Fig. 1 apparatus whereby the work piece 15 is rotated at a variable speed depending upon the radial position of the tool 10. My invention contemplates that the speed with which the work piece 15 is rotated may be varied in any predetermined desired manner. Generally, however, it is thought preferable to have the work piece 15 rotate at an increasing speed as the tool 10 approaches the center of rotation.

Referring to Fig. 1, I show the headstock 2 rotated by a hydraulic motor 120 through gears 121A and 122A. In Fig. 2 I show diagrammatically the fluid control circuit for the hydraulic motor 120. Hydraulic fluid under pressure is transmitted to the motor 120 through a pipe 121 connected to the outlet of a variable fluid resistance 122 which is supplied with hydraulic fluid from a suitable pump 123 driven by a motor 124. The pump 123 and fluid resistance 122 are for convenience housed in a hydraulic fluid reservoir 125 and the hydraulic fluid discharged from the motor 120 is returned thereto through a pipe 121B.

The fluid resistance 122 is disclosed in detail in my Patent 2,372,426 and will be described only briefly herein. This resistance, at some position of the movable member 126, has a minimum resistance at which position the flow of oil to the motor 120 will be at maximum, and accordingly the headstock 2 will rotate at maximum speed. If the member 126 is positioned upwardly or downwardly from this position the fluid resistance 122 will increase, thereby causing the motor 120 and headstock 2 to rotate at a slower speed.

The position of the member 126 is controlled by an expansible bellows 127 connected through a pipe 128 and 3-way valve 129 to a nozzle 130 carried by the movable carriage 7. Air under pressure is supplied the pipe 128 through an orifice 131. As the rate of discharge through the nozzle 130 decreases, the pressure within the pipe 128 will increase, thereby causing the bellows 127 to position the member 126 downwardly. Conversely upon an increase in the rate of discharge from the nozzle 130 the bellows 127 will contract, causing the member 126 to move upwardly, causing a corresponding change in the resistance of the fluid resistance 122.

The rate of discharge through the nozzle 130 is controlled by means of a cam 132 secured to the cross-slide 8. The cam 132 may be given any shape desired, so that the magnitude of the fluid resistance 122, and accordingly the speed of the motor 120 and headstock 2 will be varied as desired. For reasons heretofore stated it is usually preferable to have the rotative speed of the work piece 15 increase as the tool 10 is positioned toward the center thereof. Accordingly, under usual operating conditions the cam 132 will be provided with a straight taper and adjusted relative to the nozzle or discharge device 130, so that when the tool 10 is at the maximum radial distance from the center of rotation of the work piece 15 the member 126 will be positioned so that the fluid resistance 122 is at a maximum, and thereafter as the tool 10 approaches the center of rotation of the work piece 15 the speed of rotation thereof will increase. It will be evident however, that the cam 132 may be given any shape whatsoever to produce a desired functional relation between the transverse positioning of the tool 10 and speed of rotation of the workpiece 15.

In order that the fluid motor 120 may be manually operated at any desired speed, I provide the three-way valve 129, which in the position shown places the bellows 127 under the control of the nozzle 130. When the three-way valve 129 is shifted from the stop 133 to a stop 134 the nozzle 130 is shut off from the bellows 127 and a pipe 135 connected thereto which may be supplied with compressed air from any suitable source. Located in the pipe 135 is a control valve 136. The pressure within the bellows 127 and accordingly the speed of the hydraulic motor 120 and headstock 2 may be varied by manipulation of the valve 136, increasing or decreasing the pressure within the pipe 128. I show between the valve 136 and the three-way valve 129 a bleed port 137 open to the atmosphere, which permits a flow of pressure fluid through the valve 136, and accordingly it is evident that positioning of the valve 136 will produce corresponding variations in pressure within the pipe 128 and bellows 127.

It is apparent that any suitable tracer mechanism may be employed in the embodiment of my invention shown in Fig. 1. I have for clarity diagrammatically shown such a mechanism wherein the nozzles 24 and 25 are carried by a horizontal bar supported on the cross-slide 8 and the master feeler is carried by a substantially parallel horizontal baffle pivotally supported on the carriage 7 and urged against the shaped profile of the master 16 by suitable spring means. In operation, movements of the baffle toward or away from the nozzles 24 and 25 effect desired longitudinal movements of the carriage 7 and transverse movements of the cross-slide 8.

In Figs. 3, 4 and 5 I illustrate the application of my invention to a vertical milling machine, such as shown in my Patent No. 2,259,472. In Fig. 3 I show in sectional plan view so much of a vertical milling machine as is necessary for an understanding of my invention. The milling machine has a vertical column 140 for supporting a knee 141 which is vertically movable along the column 140 in ways 142 formed on the column. The knee 141 is provided with ways 143 along which a saddle (not shown) is movable toward and away from the column 140. The said saddle supports a work table 144 on suitable ways so that the latter is movable to the left and right as shown in the drawing by means of a servomotor generally indicated at 145.

At 146 is shown a typical work piece consisting of a concave forging of more or less elliptical shape, and in rough form having a raised blank face extending around its entire periphery. The machining operation I have chosen to illustrate my invention as controlling consists in forming a male flange on this blank face. A cutter 147 is rotated by any suitable means (not shown) and engages the work piece 146. It is the purpose of my invention to so control the relative movement between the work piece 146 and cutter 147 that the former will be accurately formed to a desired profile.

The work piece 146 is shown as being secured to a fixture 148 by adjustable clamping means 149. Because of the nature of the machining operation to be performed the fixture 148 is mounted on a circular table 150, shown more clearly in Fig. 4, secured to the work table 144 and rotated at desired speed by a hydraulic motor 151. In Fig. 3 I have shown the operative connections between the motor 151 and table 150 in diagrammatic form, it being evident that suitable reducing gears, universal joints, etc. may be employed as necessary. It is sufficient for the purpose of illustrating my invention to state that the table 150 is rotated at a speed corresponding with the rate of rotation of the motor 151. Machining of the work piece 146 is completed in one revolution of the circular table 150. During the revolution the work piece 150 is moved relative to the cutter 147 and the rate of rotation of the work piece 146 varied so that the cutter 147 accurately profiles the male flange and the work piece.

The fixture 148 has a horizontally extending skirt 152 forming a cam or template which by means now to be described controls the relative movement between the tool and work piece so that the raised flange on the latter is properly formed. The skirt 152 is preferably provided with a raised barrier 152A to hold chips cut from the work piece from scattering.

Secured to the knee 141 is an arm 153 which carries a nozzle 154. The arm 153 also pivotally supports a follower 155 having a projection 156 urged by a spring 156A against the cam 152. As the circular table 150 rotates, changes in the shape of the pattern 152 will cause the follower 155 to be positioned toward or away from the nozzle 154.

The nozzle 154 is supplied with a suitable fluid under pressure, such as compressed air, from any suitable source (not shown) through a shut-off valve 157, a pressure regulating valve 158, a volume tank 159, an orifice 160 and pipe 161. As the follower 155 approaches the nozzle 154, the pressure in pipe 161 between the orifice 160 and nozzle 154 will increase, whereas movements of the follower 155 away from the nozzle 154 will effect corresponding decreases in pressure within the pipe 161.

Variations in pressure within the pipe 161 control the operation of the servo-motor 145. Referring to Fig. 5, it will be observed that the pipe 161 connects to a bellows 163 through a pipe 164. Movements of the bellows 163 control the operation of a pilot valve 165 supplied with hydraulic fluid from a pump 166 driven by a motor 167. So long as a normal distance exists between the nozzle 154 and the follower 155, the movable member 168 of the pilot valve 165 is in the neutral position and the servo-motor 145 remains stationary. When, however, the follower 155 approaches toward or recedes from the nozzle 154 the member 168 is positioned downwardly or upwardly, causing the servo-motor 145 to position the work table 144 accordingly. Thus, for example, assuming the follower 155 to be positioned away from the nozzle 154 by virtue of a change in the contour of the pattern 152, the servo-motor 145 will position the work table 144 in such a direction as to restore the follower 155 to its original position relative to the nozzle 154. In the embodiment of my invention illustrated in Fig. 3, upon the follower 155 being positioned in a counterclockwise direction, thereby moving away from the nozzle 154, the servo-motor 145 will operate to position the work table 144 to the left as viewed in the drawing until normal distance is restored between the follower 155 and nozzle 154. It is apparent that by proper shaping of the pattern 152 any desired contour may be cut on the work piece 146.

As shown in Fig. 3, the servo-motor 145 and the hydraulic circuits therefor, including the pilot valve 165, pump 166, and electric motor 167, are preferably arranged in a unit which may be conveniently mounted relative to the milling machine. Likewise suitable control and protective devices may be provided. Thus I show in the electric circuit to the motor 167 a fluid pressure responsive switch 169 adapted to open the circuit to the motor 167 upon failure of fluid pressure. Likewise I show in the circuit to the motor 167 a push button station 170, so that the operation thereof may be started and stopped by an operator.

If the circular table 150 rotates at constant speed, because of the non-circular contour desired on the work piece 146, the relative movement between it and the tool 147 will vary greatly. As will be readily appreciated by those familiar with the art, the uneven feeding resulting from such non-uniform movement will result in an uneven surface on the work piece 146 in those portions where the relative rate of movement between tool and work piece is not at the optimum. Accordingly, my invention contemplates varying the speed of the circular table 150 in accordance with the contour of the work piece 146, so that the latter is always moved relative to the tool 147 at an optimum rate of speed. To accomplish this result I show the hydraulic motor 151 under the control of a control couple comprising a nozzle 171 and follower 172, the latter being provided with a projection 173 urged by a spring 173A against a cam 175 secured to the table 150. The nozzle 171 is mounted on the work table 144. The follower 172 is pivotally mounted at 176 to the work table. It will be evident that so long as the cam 175 is circular there will be no change in the distance between the follower 172 and the nozzle 171. A change in radius of the cam 175 will, however, cause the baffle 172 to move toward or away from the nozzle 171.

The nozzle 171 is supplied with compressed air under pressure from the same source as the nozzle 154, through an orifice or other restriction 177. Movements of the follower 172 toward or away from the nozzle 171 cause corresponding variations in pressure within the nozzle 171, which are transmitted through a pipe 178 to a control unit generally indicated at 179. The control unit 179 is similar to the unit illustrated in Fig. 2, and controls the flow of hydraulic fluid, to and from the hydraulic motor 151 in accordance with the pressure of the fluid within pipe 178. As explained with reference to the control unit shown in Fig. 2, at one value of pressure the control unit 179 is so arranged that a maximum flow of hydraulic fluid to the motor 151 will be established. As the pressure within pipe 178 increases or decreases from this value, the control unit 179 will act to proportionately decrease the flow of hydraulic fluid to the motor 151, thereby decreasing the rate of speed of the circular table 150.

The cam 175 may be shaped so that when the tool 147 and work piece 146 are relatively moved at maximum speed the baffle 172 is a normal distance from the nozzle 171, and that when the desired shape of the work piece 146 is such that the relative speed between it and the tool 147 is desirably decreased, the radius of the cam 175 is either increased or decreased. By varying or shaping the cam to different radii at different points it is evident that the relative rate of movement between the tool 147 and work piece 146 may be varied as desired.

In Fig. 5 I have shown the control unit 179 diagrammatically and it comprises an adjustable fluid resistance 180 supplied with hydraulic fluid from a pump 181 driven by a motor 182. A bellows 183, to which pipe 178 is connected, positions the movable member of the fluid resistance 180 in accordance with variations in the shape of the cam or pattern 175.

Operation of the motor 182 may be controlled by a suitable switch 190. Also to stop or prevent operation of the motor 182 upon failure of air pressure the switch 169 may be, as shown, connected in circuit with the motor 182.

Throughout the foregoing specification and in the claims to follow I have indicated that the work piece is formed to correspond to the profile or shape of the master. By such language I do not intend to imply that the work piece is brought to the exact shape of the master, but as will be evident to those familiar with the art the master will be formed so that the ultimate shape of the work piece produced is that desired, and that therefore the shape of the work piece will differ from that of the master by the amount of angularity, etc. in the mechanism.

What I claim as new, and desire to secure by Letters Patent of the United States, is:

1. In combination with a lathe having a rotatable live center, a hydraulic motor for rotating the live center, a carriage and a cross-slide mounted on said carriage, a nozzle having a port to atmosphere through which fluid is continuously discharged, means for variably throttling the discharge of fluid from said nozzle in accordance with the relative positions of said carriage and cross-slide to thereby produce corresponding variations in pressure in said nozzle, and means under the control of said pressure for regulating the speed of said motor.

2. In combination with a lathe having a rotatable live center, a motor for rotating the live center a carriage and a cross-slide mounted on the carriage, a device movable with the carriage discharging a fluid to the atmosphere from a normally constant pressure source, means movable with the cross-slide controlling the discharge in accordance with the relative positions of said carriage and cross-slide to thereby produce corresponding variations in pressure of the fluid ahead of said device, and means under the control of said pressure for regulating the speed of said motor.

3. In combination with a machine tool having a rotatable work-holder and a tool holder, the work-holder and the tool-holder being constructed and arranged for relative bodily movement, a hydraulic motor for rotating the work-holder, fluid pressure means supplying fluid under pressure to said hydraulic motor, power means for relatively moving the work-holder and the tool-holder, means for establishing a fluid pressure, independent of said fluid pressure supplied to said hydraulic motor, continuously corresponding to the relative position of the work-holder and the tool-holder, and means under the control of the independent pressure so established for varying the speed of the motor for rotating the work-holder.

4. In combination with a lathe having a rotatable work-holder, a motor for rotating the work-holder, a carriage and a cross-slide mounted on the carriage, means discharging a fluid to the atmosphere from a substantially constant pressure source, means controlling the discharge from said first means in accordance with the relative position of said carriage with respect to said cross-slide to thereby produce corresponding variations in pressure of the fluid ahead of said first means, one of said means being movable with the carriage and the other said means being movable with the cross-slide, and additional means controlled by the variation in pressure for regulating the speed of the motor.

5. In combination with a lathe having a rotatable work-holder, a motor for rotating the work-holder, a carriage and a cross-slide mounted on the carriage, means discharging air to the atmosphere from a substantially constant pressure source, means controlling the discharge from said first means in accordance with the relative positions of said carriage and cross-slide to thereby produce corresponding variations in pressure of the air ahead of said first means, one of said means being movable with the carriage and the other said means being movable with the cross-slide, and additional means controlled by the variation in pressure for regulating the speed of the motor.

CLARENCE JOHNSON.

REFERENCES CITED

The following references are of record in the file of this patent:

UNITED STATES PATENTS

| Number | Name | Date |
|---|---|---|
| 1,656,544 | Thoma | Jan. 17, 1928 |
| 1,961,089 | Smith et al. | May 29, 1934 |
| 2,209,037 | Riegger | July 23, 1940 |
| 1,871,752 | Simonds | Aug. 16, 1932 |
| 1,716,115 | Clark et al. | June 4, 1929 |
| 2,068,890 | Sassen | Jan. 26, 1937 |
| 1,709,674 | Kuhl | Apr. 16, 1929 |
| 2,271,598 | Maurer | Feb. 3, 1942 |
| 2,259,472 | Johnson | Oct. 21, 1941 |
| 2,025,748 | Howe | Dec. 31, 1935 |
| 2,150,032 | Herman | Mar. 7, 1939 |

FOREIGN PATENTS

| Number | Country | Date |
|---|---|---|
| 513,715 | Germany | Dec. 1, 1930 |